(12) United States Patent
Ames

(10) Patent No.: US 7,352,073 B2
(45) Date of Patent: Apr. 1, 2008

(54) OCEAN WAVE ENERGY CONVERTER HAVING AN IMPROVED GENERATOR AND BALLAST CONTROL

(76) Inventor: P. Foerd Ames, 20 Burnside St., Bristol, RI (US) 02809

( * ) Notice: Subject to any disclaimer, the term of this patent is extended or adjusted under 35 U.S.C. 154(b) by 77 days.

(21) Appl. No.: 11/160,501

(22) Filed: Jun. 27, 2005

(65) Prior Publication Data
US 2005/0285402 A1 Dec. 29, 2005

Related U.S. Application Data

(60) Provisional application No. 60/583,374, filed on Jun. 28, 2004.

(51) Int. Cl.
F03B 13/10 (2006.01)
F03B 13/12 (2006.01)
H02P 9/04 (2006.01)

(52) U.S. Cl. .................. 290/42; 310/178
(58) Field of Classification Search .......... 290/42; 310/178
See application file for complete search history.

(56) References Cited

U.S. PATENT DOCUMENTS

| | | | | |
|---|---|---|---|---|
| 659,609 | A * | 10/1900 | McIntyre | 60/506 |
| 1,403,702 | A * | 1/1922 | Melvin | 60/496 |
| 3,746,875 | A * | 7/1973 | Donatelli | 290/42 |
| 3,894,241 | A * | 7/1975 | Kaplan | 290/42 |
| 3,898,471 | A * | 8/1975 | Schera, Jr. | 290/42 |
| 3,927,436 | A * | 12/1975 | Inoue et al. | 15/250.17 |
| 3,930,168 | A * | 12/1975 | Tomabene | 290/53 |
| 3,944,865 | A * | 3/1976 | Jewitt | 310/178 |
| 3,961,863 | A * | 6/1976 | Hooper, III | 417/334 |
| 3,965,365 | A * | 6/1976 | Parr | 290/53 |
| 4,012,964 | A * | 3/1977 | Lee | 74/435 |
| 4,145,885 | A * | 3/1979 | Solell | 60/504 |
| 4,206,601 | A * | 6/1980 | Eberle | 60/398 |
| 4,232,230 | A | 11/1980 | Ames | 290/53 |
| 4,341,074 | A * | 7/1982 | French | 60/504 |
| 4,352,299 | A * | 10/1982 | Riggs et al. | 74/84 R |
| 4,495,765 | A * | 1/1985 | French | 60/398 |
| 4,544,849 | A * | 10/1985 | Choi | 290/53 |
| 4,560,884 | A * | 12/1985 | Whittecar | 290/42 |
| 4,599,858 | A * | 7/1986 | La Stella et al. | 60/497 |
| 4,660,698 | A * | 4/1987 | Miura | 192/45 |
| 4,672,222 | A | 6/1987 | Ames | 290/53 |
| 4,684,815 | A * | 8/1987 | Gargos | 290/53 |
| 4,686,377 | A * | 8/1987 | Gargos | 290/53 |
| 4,742,241 | A * | 5/1988 | Melvin | 290/53 |
| 4,748,338 | A * | 5/1988 | Boyce | 290/42 |
| 4,754,157 | A * | 6/1988 | Windle | 290/53 |
| 5,105,094 | A * | 4/1992 | Parker | 290/53 |
| 5,167,786 | A * | 12/1992 | Eberle | 204/228.2 |
| 5,182,957 | A * | 2/1993 | Bohmer et al. | 74/42 |

(Continued)

Primary Examiner—Darren Schuberg
Assistant Examiner—Pedro J. Cuevas
(74) Attorney, Agent, or Firm—Barlow, Josephs & Holmes, Ltd.

(57) ABSTRACT

The ocean wave energy converter uniquely includes a generator with a rotating inner rotor surrounded by a counter-rotating outer rotor for generating electricity. A reciprocating drive rod drives the inner rotor on the downstroke of the drive rod and the outer rotor on the upstroke of the drive rod through a gear driven driveshaft with clutches. A buoy is attached to end of the drive rod whereby the undulation of the ocean waves relative to the buoy reciprocates the drive rod between the upstroke and the downstroke positions.

19 Claims, 6 Drawing Sheets

U.S. PATENT DOCUMENTS

| | | | |
|---|---|---|---|
| 5,333,351 A * | 8/1994 | Sato | 15/250.13 |
| 5,359,229 A * | 10/1994 | Youngblood | 290/53 |
| 5,424,582 A * | 6/1995 | Trepl et al. | 290/53 |
| 5,495,907 A * | 3/1996 | Data | 180/65.2 |
| 5,506,453 A * | 4/1996 | McCombs | 290/44 |
| 5,655,232 A * | 8/1997 | Buckwalter | 4/508 |
| 5,694,812 A * | 12/1997 | Maue et al. | 74/471 R |
| 5,854,516 A * | 12/1998 | Shim | 290/53 |
| 5,921,082 A * | 7/1999 | Berling | 60/325 |
| 5,929,531 A * | 7/1999 | Lagno | 290/53 |
| 6,020,653 A * | 2/2000 | Woodbridge et al. | 290/53 |
| 6,026,536 A * | 2/2000 | Miller et al. | 15/250.31 |
| 6,051,905 A * | 4/2000 | Clark | 310/178 |
| 6,269,636 B1 * | 8/2001 | Hatzilakos | 60/398 |
| 6,388,347 B1 * | 5/2002 | Blake et al. | 310/74 |
| 6,429,778 B1 * | 8/2002 | Chuang | 340/623 |
| 6,476,512 B1 * | 11/2002 | Rutta | 290/42 |
| 6,486,786 B2 * | 11/2002 | Chuang | 340/623 |
| 6,504,260 B1 * | 1/2003 | Debleser | 290/44 |
| 6,515,391 B2 | 2/2003 | Whitesell | 310/178 |
| 6,536,277 B1 * | 3/2003 | Chuang | 73/319 |
| 6,544,084 B1 * | 4/2003 | Nanami | 440/88 R |
| 6,603,233 B2 * | 8/2003 | Strohm | 310/178 |
| 6,633,096 B2 | 10/2003 | Ooiwa | 310/45 |
| 6,648,702 B2 * | 11/2003 | Nanami et al. | 440/1 |
| 6,656,326 B2 * | 12/2003 | Nagler | 202/234 |
| 6,665,789 B1 * | 12/2003 | Stecker, Sr. | 114/315 |
| 6,692,230 B2 * | 2/2004 | Selsam | 416/132 B |
| 6,695,536 B2 * | 2/2004 | Sanchez Gomez | 405/76 |
| 6,831,373 B1 * | 12/2004 | Beaston | 290/43 |
| 6,864,608 B2 | 3/2005 | Kang et al. | 310/154.02 |
| 6,881,331 B1 * | 4/2005 | Barnes | 210/192 |
| 6,910,498 B2 * | 6/2005 | Cazden | 137/392 |
| 7,045,912 B2 * | 5/2006 | Leijon et al. | 290/42 |
| 7,101,117 B1 * | 9/2006 | Chow | 405/201 |
| 7,105,942 B2 * | 9/2006 | Henriksen | 290/55 |
| 7,128,014 B2 * | 10/2006 | Berthiaume et al. | 114/253 |
| 7,134,925 B2 * | 11/2006 | Kinoshita | 440/88 A |
| 7,141,888 B2 * | 11/2006 | Sabol et al. | 290/53 |
| 7,164,212 B2 * | 1/2007 | Leijon et al. | 290/42 |
| 7,182,656 B2 * | 2/2007 | Nanami et al. | 440/1 |
| 7,186,334 B1 * | 3/2007 | Barnes | 210/192 |
| 7,199,481 B2 * | 4/2007 | Hirsch | 290/42 |
| 7,199,484 B2 * | 4/2007 | Brashears | 290/54 |
| 7,214,029 B2 * | 5/2007 | Richter | 415/4.5 |
| 7,242,106 B2 * | 7/2007 | Kelly | 290/42 |
| 7,245,041 B1 * | 7/2007 | Olson | 290/53 |
| 7,298,054 B2 * | 11/2007 | Hirsch | 290/42 |
| 2001/0040122 A1 * | 11/2001 | Barnes | 210/123 |
| 2001/0045790 A1 * | 11/2001 | Whitesell | 310/236 |
| 2002/0023866 A1 * | 2/2002 | Barnes | 210/192 |
| 2002/0038571 A1 * | 4/2002 | Chuang | 73/313 |
| 2002/0063628 A1 * | 5/2002 | Chuang | 340/612 |
| 2002/0113022 A1 * | 8/2002 | Gadgil et al. | 210/748 |
| 2002/0164906 A1 * | 11/2002 | Nanami et al. | 440/1 |
| 2002/0192070 A1 * | 12/2002 | Selsam | 415/4.3 |
| 2003/0075096 A1 * | 4/2003 | Leonard et al. | 114/331 |
| 2003/0099516 A1 * | 5/2003 | Chow | 405/195.1 |
| 2003/0111925 A1 * | 6/2003 | Strohm | 310/178 |
| 2004/0029459 A1 * | 2/2004 | Berthiaume et al. | 440/1 |
| 2004/0035465 A1 * | 2/2004 | Cazden | 137/392 |
| 2004/0096327 A1 * | 5/2004 | Appa et al. | 416/1 |
| 2004/0102108 A1 * | 5/2004 | Nanami et al. | 440/84 |
| 2004/0180585 A1 * | 9/2004 | Kinoshita | 440/1 |
| 2005/0082421 A1 * | 4/2005 | Perlo et al. | 244/12.2 |
| 2005/0121915 A1 * | 6/2005 | Leijon et al. | 290/42 |
| 2006/0011777 A1 * | 1/2006 | Arlton et al. | 244/7 B |
| 2006/0125243 A1 * | 6/2006 | Miller | 290/55 |
| 2006/0162642 A1 * | 7/2006 | Morse | 114/382 |
| 2006/0191461 A1 * | 8/2006 | Chow | 114/264 |
| 2006/0273594 A1 * | 12/2006 | Gehring | 290/42 |
| 2007/0040384 A1 * | 2/2007 | Bernhoff et al. | 290/42 |
| 2007/0080539 A1 * | 4/2007 | Kelly | 290/42 |
| 2007/0132246 A1 * | 6/2007 | Hirsch | 290/42 |
| 2007/0228736 A1 * | 10/2007 | Smushkovich | 290/42 |
| 2007/0228737 A1 * | 10/2007 | Hirsch | 290/42 |

* cited by examiner

OCEAN WAVE ENERGY CONVERTER HAVING AN IMPROVED GENERATOR AND BALLAST CONTROL

CROSS-REFERENCE TO RELATED APPLICATION

This application claims priority to earlier filed U.S. Provisional Patent Application Ser. No. 60/583,374 filed Jun. 28, 2004, the contents of which are incorporated herein by reference.

BACKGROUND OF THE INVENTION

1. Field of the Invention

The present invention generally relates to an apparatus for converting the energy of wave motion on the surface of a body of water to electricity. The assembly is designed as an ocean wave energy converter module that can be interconnected to other modules to form an ocean wave energy web.

2. Background of the Related Art

Ames, U.S. Pat. No. 4,232,230 describes an ocean wave energy converter module having several linear reciprocating electric generators, which are assembled in a generally pyramidal or conical form. Their movable armature members are connected to floats (buoys) above the apex which are adapted to follow displacements of the water surface. The lower ends of their stator members are connected at separated points to a damper plate below the surface. A submerged buoyancy chamber is provided above the damper plate to maintain the assembly in proper relationship to the mean surface. Although this design had the advantage of a minimal number of moving parts, it suffered from several disadvantages. Namely, the use of many permanent magnets made the design costly. Moreover, not all the permanent magnets were being used to their optimal capacity resulting in its inefficient use. Therefore, there was a need for an ocean wave energy converter that was less costly to produce and had higher power production efficiency.

Ames, U.S. Pat. No. 4,672,22, describes a self-stabilized and expandable system of independent ocean wave energy converter modules and was designed to overcome some limitations of the earlier '230 patent. In particular, the system included replacement of the permanent magnets in the stator members with a reciprocating drive rod that powered a flywheel and attached generator. Provision was also made for use of two generators, the first being scaled for power production on the upstroke of the drive rod and the second scaled for power production on the downstroke of the drive rod. The goal of the '222 patent was to optimize power production on the upstroke of the drive rod where the energy of the wave is concentrated, rather than follow other attempts to create energy converters that attempted to maximize power production on both the peak and the troth of the wave. A design that attempts to maximize both peak and troth power generation suffers from the inherent disadvantage that the ocean wave energy converter risks falling out of synchronization with the period of the oncoming waves and therefore becoming stalled. But even the '222 patent design suffered several undesirable limitations. In particular, the design required the use of two generators. Therefore there is a need for an improved ocean wave energy converter that utilizes a single variable generator to maximize upstroke power generation without risk of stalling of the generator due to synchronization of the drive rod with the period of the waves.

SUMMARY OF THE INVENTION

The ocean wave energy converter of the present invention solves the problems of the prior art by providing an ocean wave energy converter that uniquely includes a generator with a rotating inner rotor surrounded by a counter-rotating outer rotor for generating electricity. A reciprocating drive rod drives the inner rotor on the downstroke of the drive rod and the outer rotor on the upstroke of the drive rod through a gear driven driveshaft with clutches. A buoy is attached to end of the drive rod whereby the undulation of the ocean waves relative to the buoy reciprocates the drive rod between the upstroke and the downstroke positions.

Accordingly, among the objects of the present invention is the provision for an ocean wave energy converter that maximizes upstroke power generation.

Another object of the present invention is the provision for an ocean wave energy converter that includes a single generator for generating electricity that includes counter-rotating rotors to maximize power production.

Yet another object of the present invention is the provision for an ocean wave energy converter that includes a ballast control system.

Yet another object of the present invention is the provision for an ocean wave energy converter that can operate autonomously.

Yet another object of the present invention is the provision for an ocean wave energy converter that can be deployed throughout the world.

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE PREFERRED EMBODIMENT

Figure 1:
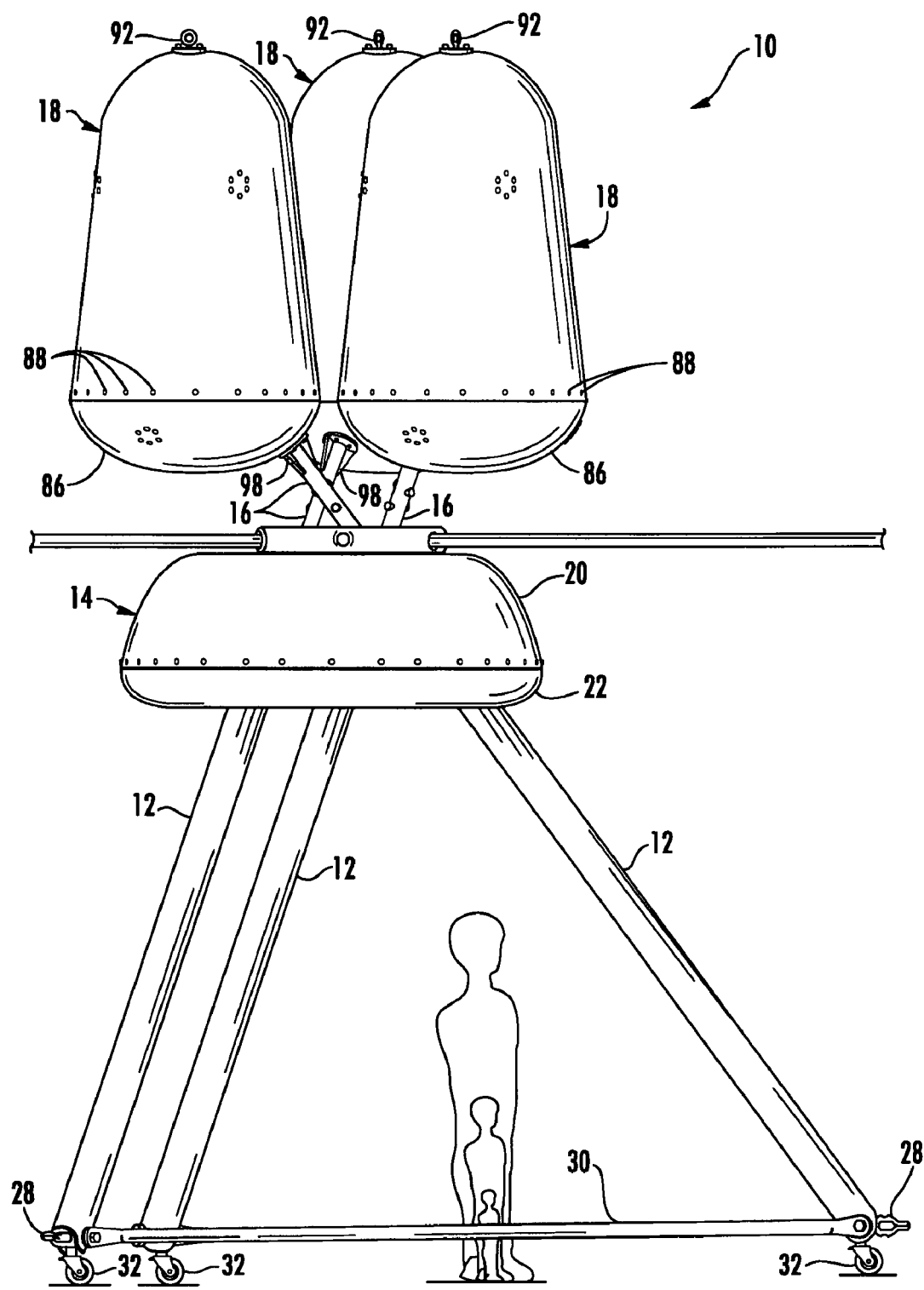
FIG. 1 is an elevation view of the preferred embodiment of the present invention.

Referring to FIG. 1, the ocean wave energy converter ("OWEC") assembly of the present invention is shown generally at 10. As will be more fully described below, the OWEC assembly 10 of the present invention includes three tubular members 12 positioned in a tetrahedral arrangement that has a main body member 14 connected at the apex of the tetrahedron. Each of the tubular members 12 contains a drive rod 16 slidably received therein. Each drive rod 16 is respectively connected to its own buoy 18. The OWEC assembly 10 of the present invention can be scaled appropriately to an optimal size for the known conditions or factors at the desired deployment site, such as average wave height, historical maximum wave height, depth of water, strength of currents, etc. One skilled in the art would appreciate how to select the parts and materials to construct an OWEC assembly 10 of the present invention of the desired size.

Figure 2:
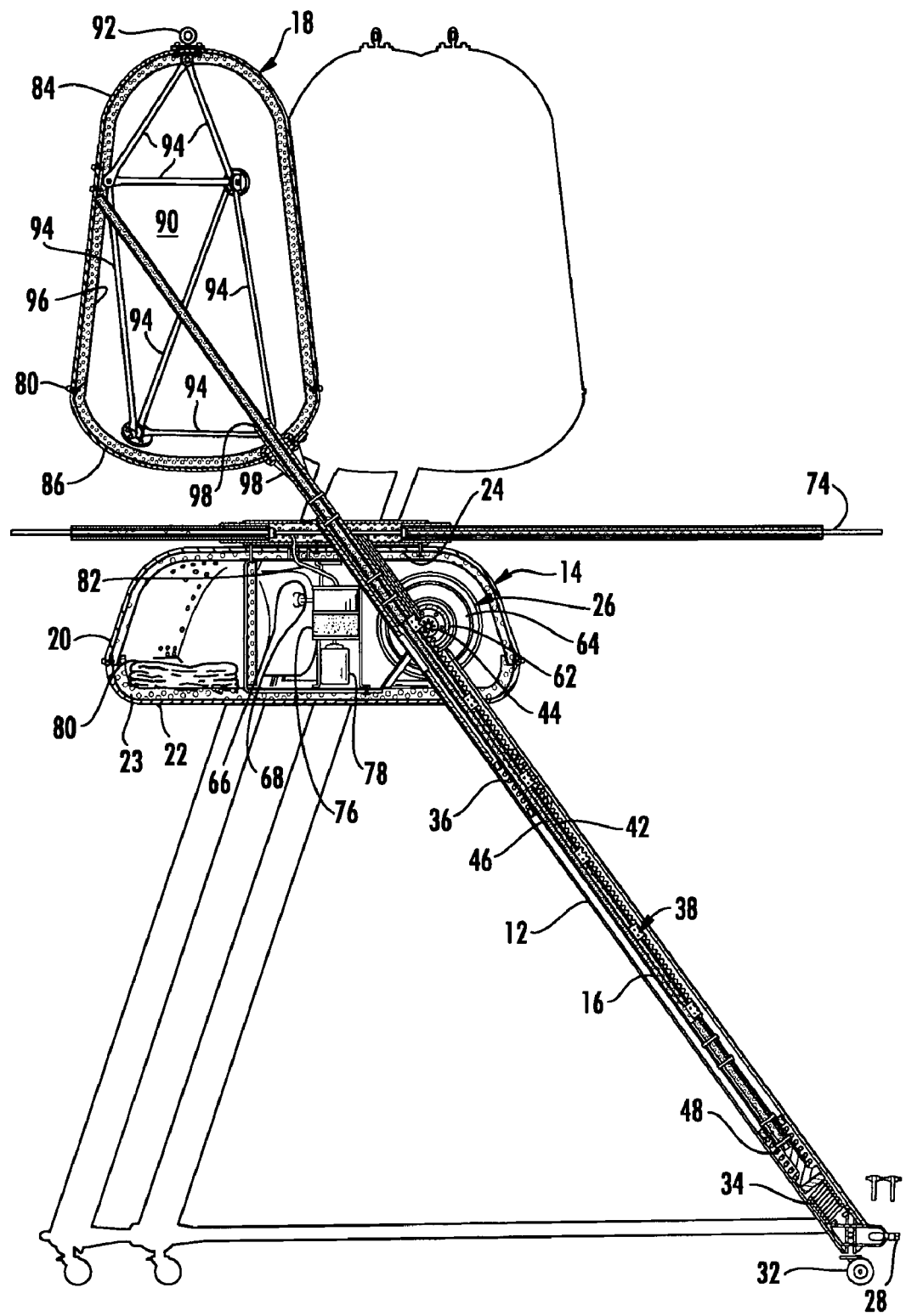
FIG. 2 is a partial cross-section view of FIG. 1.
Figure 7:
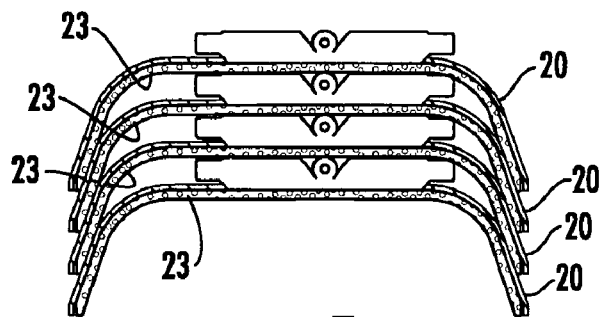
FIG. 7 is a side cross-section view of the preferred method of storing the unassembled top shell of the main body member of the preferred embodiment.
Figure 11:
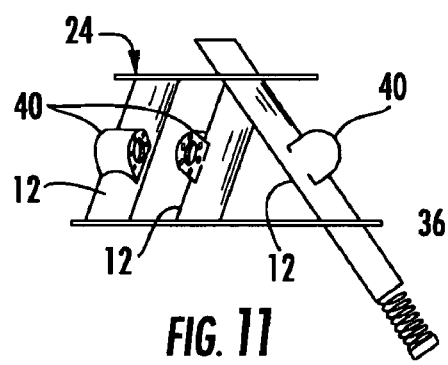
FIG. 11 is a side cross-section view of the chassis of the preferred embodiment of the present invention.
Figure 8:
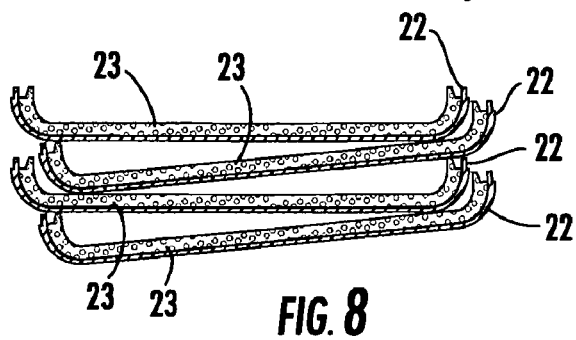
FIG. 8 is a side cross-section view of the preferred method of storing the unassembled top shell of the main body member of the preferred embodiment.

Referring to FIGS. 1 and 2, the main body member 14 of the OWEC assembly 10 includes a top shell 20 and a bottom shell 22. The top shell 20 and bottom shell 22 are secured together around a chassis 24, which is best seen in FIG. 11, to form a water-tight inner cavity to contain the generator 26 and ballast control components (described below). Prior to deployment of the OWEC assembly 10, the unassembled shells 20, 22 and chassis 24 of the main body member 14 may be stacked together, as shown in FIGS. 7 and 8, for ease of storage and transportation to the deployment site. Each shell 20, 22 is lined with foam 23 or other buoyant material to neutralize the buoyancy of the chassis 24, the material forming the shells 20,22, and the components (described below) contained therein.

Referring back to FIG. 2, each OWEC assembly 10 includes three tubular members 12 that are arranged in a cone structure or more specifically as edges of the sides of a tetrahedron. The tubular members 12 pass through the main body member 14 at the apex of the tetrahedron. Each tubular member 12 contains a drive rod 16, which is provided at its upper end with a buoy 18. The tubular members 12 terminate at tube base connectors 28 securing them to an optional flat damper plate 30 which may be in the form of an equilateral triangle. Although it is preferred that the arrangement of the tubular members 12 is tetrahedral, other geometric-shaped arrangements could be used and would be effective. The base connectors 28 may include optional casters 32 to facilitate transportation, deployment and recovery of the OWEC assembly 10.

Contained within the terminal end of each tubular member 12 is a lower shock absorber 34. The lower shock absorber 34 catches the downward stroke of its respective drive rod 16. The lower shock absorber 34 reduces the stress on the OWEC assembly 10 and prepares the drive rod 16 for its upward stroke as it upwardly urges the drive rod 16. At the upper end of each tubular member 12 is an upper shock absorber 36. The upper shock absorber 36 provides an upper travel limit to the upward stroke of its respective drive rod 16. The upper shock absorber 36 reduces the stress on the OWEC assembly 10, and prepares the drive rod 16 for its downward stroke as it downwardly urges the drive rod 16. Both the lower shock absorber 34 and upper shock absorber 36 are preferably metal springs, but other materials could be used as appropriate for the size of the OWEC assembly 10 in question.

Figure 3:
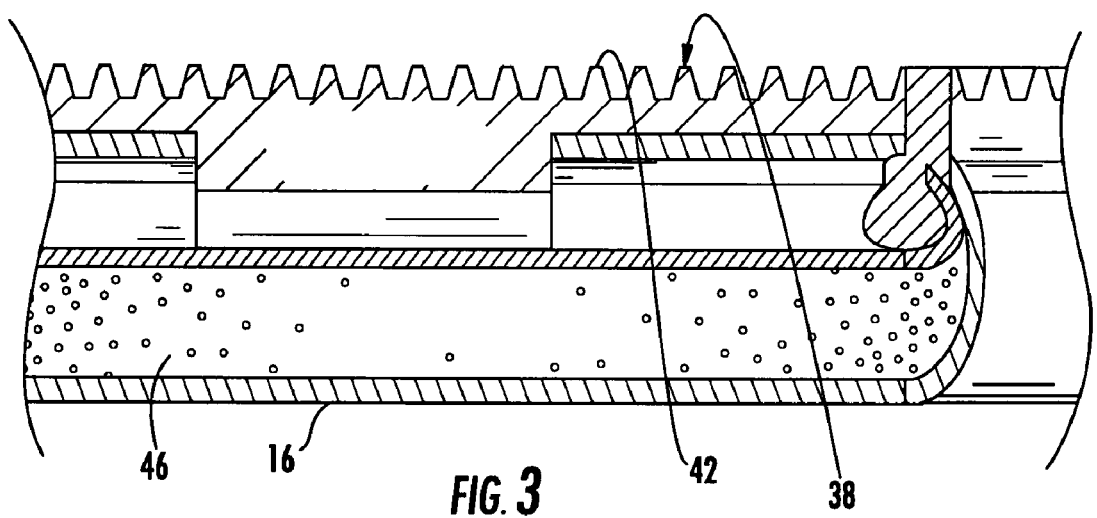
FIG. 3 is a partial side cross-section view of a drive rod of the present invention.
Figure 4:
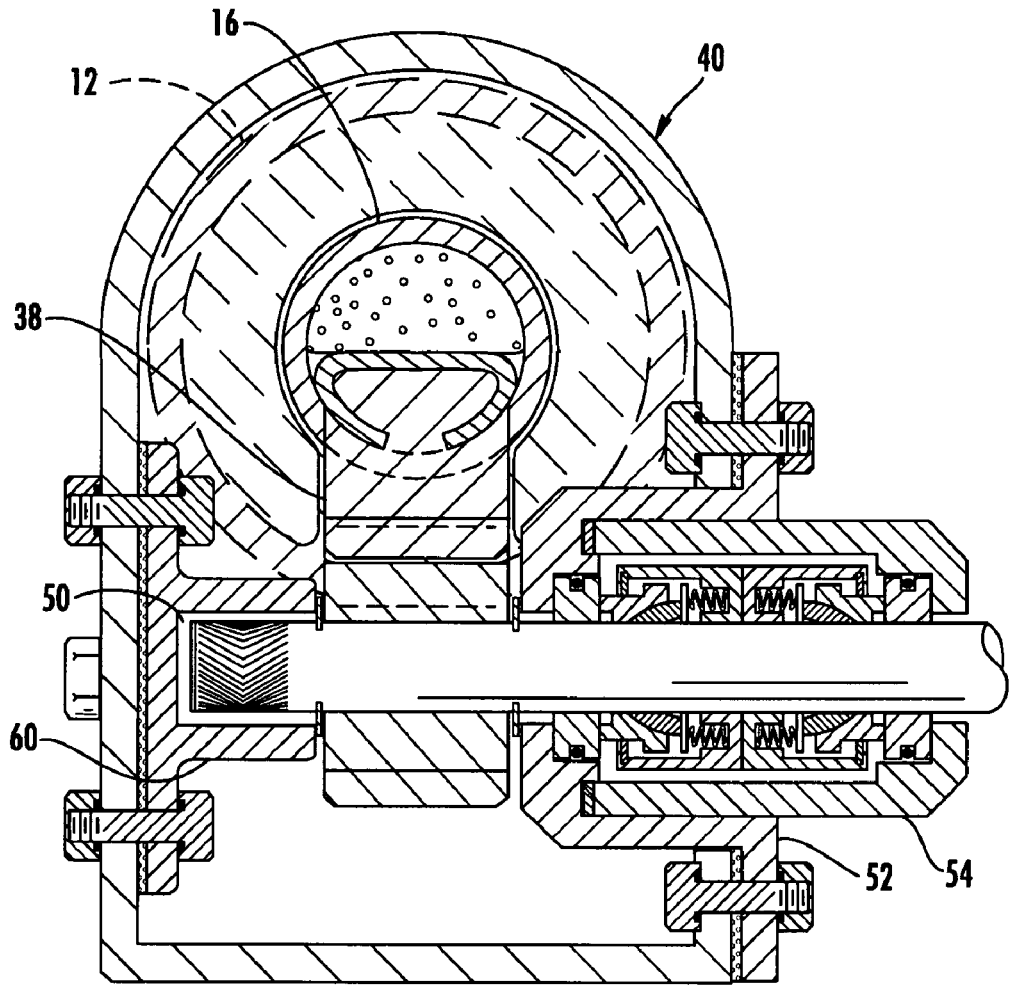
FIG. 4 is a close-up plan of the gearbox and generator of the present invention.

Also best seen in FIG. 2, the tubular members 12 serve respectively as guides or sleeves for a drive rod 16 contained therein. The drive rods 16 each have a rack 38 secured to the length of the drive rod 16 that passes through a gear box section 40 of the main body member 14. The rack 38 has teeth thereon 42, which can best be seen in FIG. 3. The teeth 42 on the rack 38 engage and drive a gear 44 in the gear box section 40 (described below). The drive rods 16 also may be partially or wholly filled with foam 46, or other buoyant material, to neutralize the buoyancy of the drive rod 16, thereby enhancing the buoyancy of the buoy 18, as seen in FIGS. 2 and 4. Turning back to FIG. 2, a secondary shock absorber 48 is attached to the lower end of the drive rod 16. The secondary shock absorber 48 of the drive rod 16 works in conjunction with the upper shock absorber 36 in the respective tubular member 12 to limit the upward travel of the drive rod 16 and reduce the stress thereon.

Figure 5:
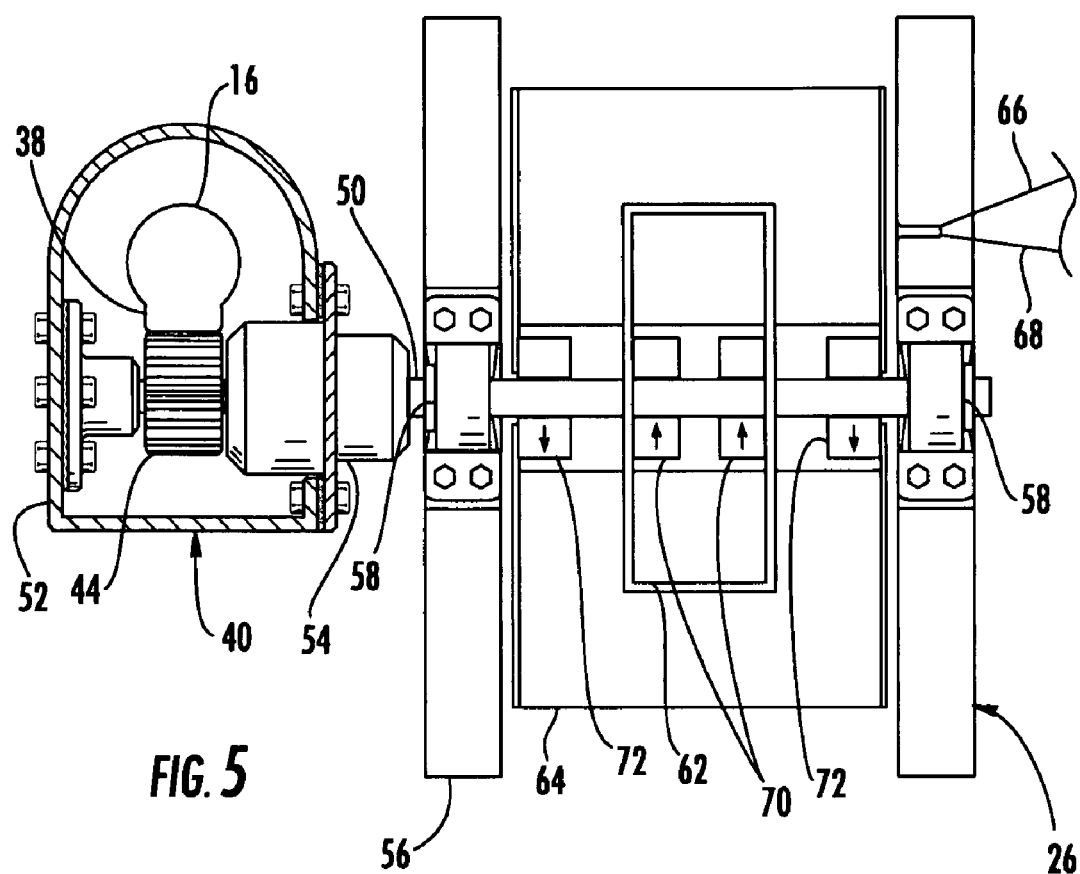
FIG. 5 is a plan view of the generator and gearbox of the preferred embodiment of the present invention.

Referring to FIGS. 4 and 5, a close up view of the gear box section 40 and generator 26 of the main body member 12 of the preferred embodiment are shown in detail. As the gear 44 is driven by the drive rod 12, the gear 44 drives a driveshaft 50 which is rotatably mounted within an axle bracket 52. The driveshaft 50 extends through a double labyrinth seal 54 and through a generator bracket 56 and into a generator 26. Although a double labyrinth seal 54 is preferred, other seals could be used. Bearings 58 are included to smooth the rotation action on the driveshaft 50. Optional bushings 60 may also be included to dampen any vibration generated by the general operation of the OWEC assembly 10.

Figure 6:
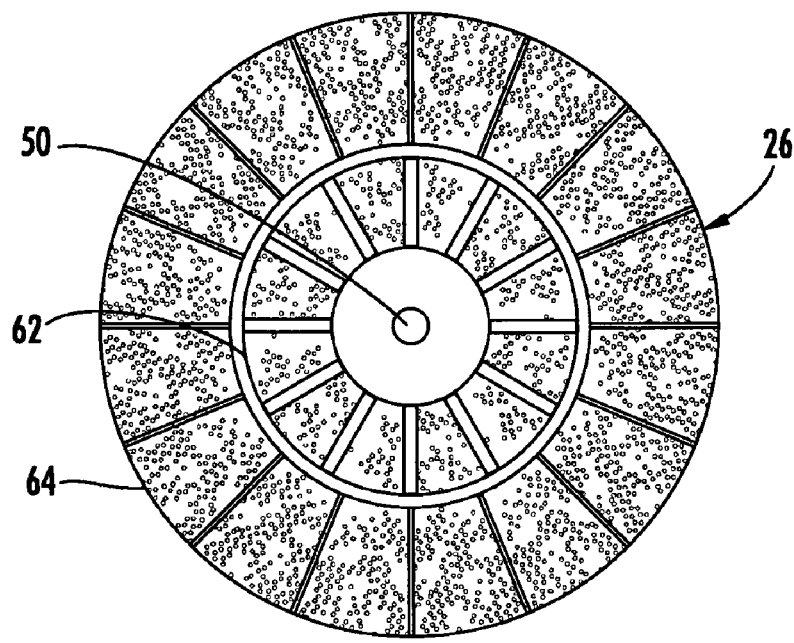
FIG. 6 is a side cross-section view of the generator of the preferred embodiment of the present invention.

As seen in FIGS. 5 and 6, the generator 26 includes an inner rotor 62 and a counter-rotating outer rotor 64. The inner rotor 62 is preferably constructed of a circular array of permanent magnets. The outer rotor 64 is constructed of one or more coils of a number of loops of wire having an input lead 66 and an output lead 68. A first pair of clutches 70 connects the inner rotor 62 to the driveshaft 50 and allows the driveshaft 50 to turn in one direction only. A second pair of clutches 72 connects the outer rotor 64 to the driveshaft 50 and allows the outer rotor 64 to only turn in the opposite direction of the inner rotor 62. Rotational movement of the inner rotor 62 relative to the outer rotor 64 induces electricity in the coil of the outer rotor 64 and through the leads 66, 68. Inducing electricity in a coil through use of a magnet is well-known in the art and does not need to be described in detail herein. The leads 66, 68 are connected to the umbilical chord 74 which carries the generated electricity to other modules or shore as described below.

In an alternative embodiment, the inner rotor 62 of the generator 26 is constructed of one or more coils of a number of loops of wire and the outer rotor 64 is constructed of a circular array of permanent magnets. Thus, being the opposite of the preferred embodiment.

In yet a third embodiment (not shown), a stationary coil is secured adjacent to the outer rotor 64 of the generator 26.

Referring back to FIG. 2, the inner cavity of the main body member 14 also includes an active ballast control system that includes a water level sensor 76, a pump 78, and three bladders 80 that are secured to the chassis 24. The water level sensor 76 measures the attitude and depth to the OWEC assembly 10 relative to mean sea level and generates control inputs to the pump 78 to keep the OWEC assembly 10 at an optimum depth in the water. The pump 78 fills or evacuates the bladders 80 according to the inputs received from the water level sensor 76. The bladders 80 are fashioned of a non-porous flexible material that is easily deformed. The pump 78 and water level sensor 76 are connected by wires 82 to the umbilical chord 74 and are powered from excess electrical power generated by the generators 26, but also could be easily supplemented from other optional power sources such as an additional battery, windmill, or a solar panel (not shown).

Figure 9:
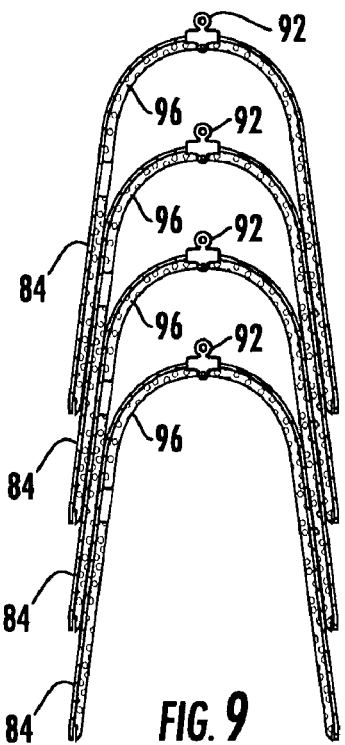
FIG. 9 is a side cross-section view of the preferred method of storing the unassembled upper shell of the buoy of the preferred embodiment.
Figure 10:
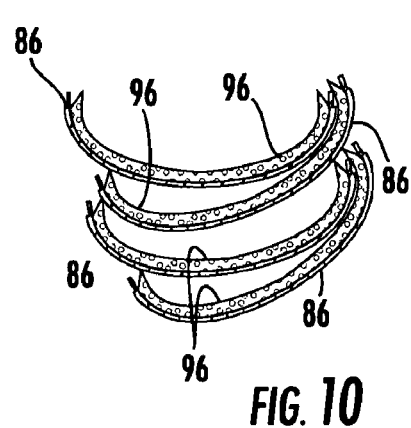
FIG. 10 is a side cross-section view of the preferred method of storing the unassembled lower shell of the buoy of the preferred embodiment.

Referring back now to FIGS. 1 and 2, each buoy 18 includes an upper shell 84 and a lower shell 86. The upper shell 84 and the lower shell 86 are secured together with rivets 88, or other suitable fasteners, to form a water-tight chamber 90, thereby making the buoy 18 highly buoyant. The upper shell optionally includes an eyebolt 92 to assist in assembling, deployment and recovery of the assembled buoys 18. Internal braces 94 are secured within the chamber of the upper and lower shells 84, 86 to give the buoy 18 added strength and rigidity. Each shell 84, 86 is lined with foam 96 or other buoyant material to neutralize the buoyancy of material forming the shells 84, 86 and the internal braces 94 container therein, thereby enhancing the buoyancy effect of the empty chamber 90. One end of the drive rod 16 is passed through an aperture 83, best seen in FIG. 10, on the lower shell 86 and secured to the upper shell 84. Optional bracing elements 98 are secured to around the drive rod 94 and to the lower shell 86 to reduce the strain on the lower shell 86 and drive rod 16 from the force of the waves impacting the buoy 18. Prior to deployment of the OWEC assembly 10, the unassembled shells 84, 86 of the buoys 18 may be stacked together, as shown in FIGS. 9 and 10, for ease of storage and transportation to the deployment site.

Figure 12:
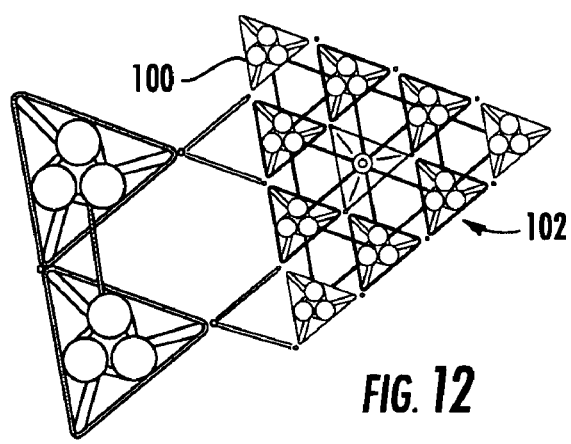
FIG. 12 is a plan view of the ocean wave energy web of the preferred embodiment of the present invention.
Figure 13:
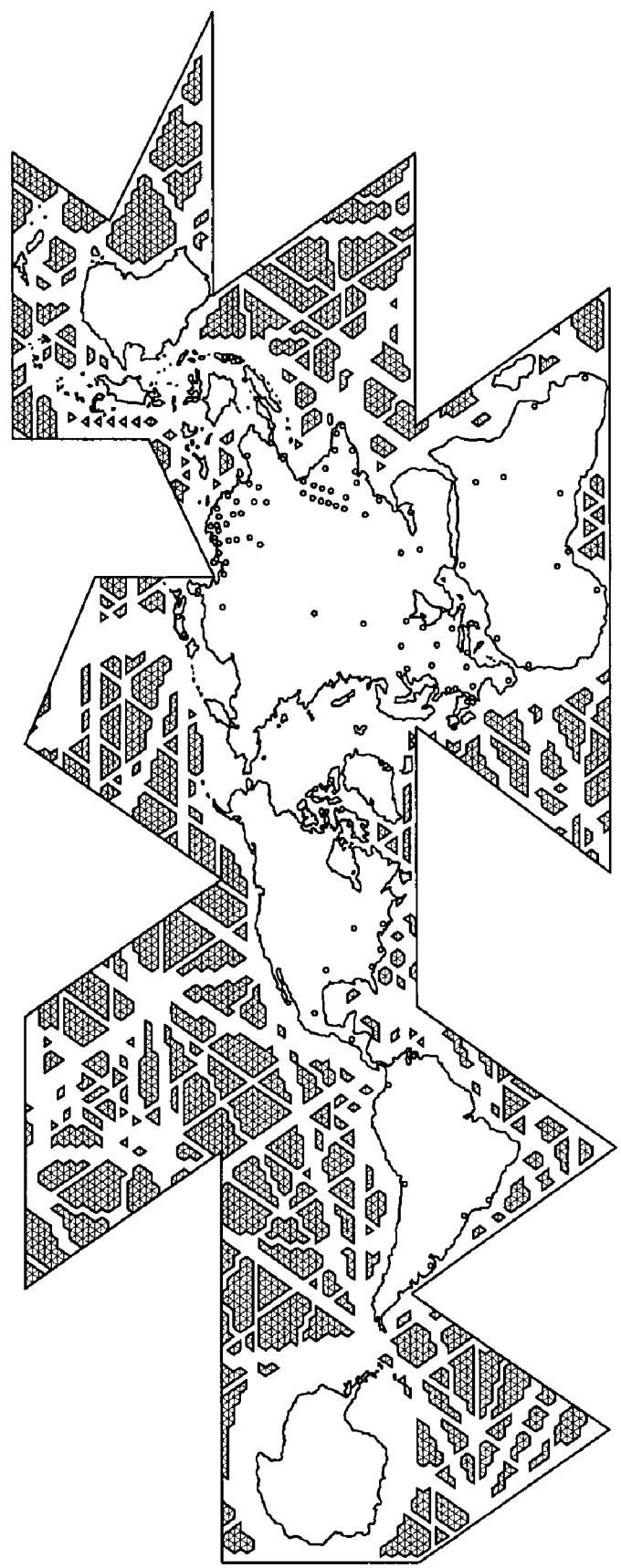
FIG. 13 is a plan view of the deployment capabilities of the preferred embodiment of the present invention.

In operation, the OWEC assembly 10 floats in a body of water with the buoys partially submerged at the surface, and the remaining part of the OWEC assembly 10 submerged in the water. As each wave passes, the buoys 18 are raised and lowered moving the drive rods 16 in the tubular members 12. The motion of a drive rod 16 drives the counter-rotating portions of the generator 26. Each buoy/drive rod combination 18/16 drives its own generator 26. The sum-total electrical output of an array of modules may be transported to shore by an umbilical cord 74 or used to power an accessory module for desalination or hydrogen production operations. Each OWEC assembly 10 forms a module 100 that can be interconnected to other modules to form an ocean wave energy web 102 to mass produce electricity, an example of which is shown in FIG. 11. The ocean wave energy web is capable of being deployed throughout the bodies of water of the world, as seen in FIG. 12.

The OWEC assembly 10 of the present invention provides several improvements over the ocean wave energy converters described in the prior art. For example, a counter-rotating generator 26, which converts more wave energy to electricity, from both the upwards and downward movement of the shaft is used. Also, bellow sleeves, which previously were used to seal the upper end of each tubular member 12, have been eliminated. Also, the tube base connectors 28 are made by extractive end cuts with through holes having common axes perpendicular to the major axes of the tubular members 12.

Therefore, it can be seen that the present invention provides a unique solution to the problem of generating reusable energy from ocean waves that is a significant improvement over the prior art and has substantial commercial merit.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. An apparatus for converting the kinetic energy of ocean waves into electricity, comprising:
    a main body member;
    at least one generator located within the main body member for generating electricity, the at least one generator having:
        a driveshaft having a positive direction and a negative direction;
        an inner rotor driven by the driveshaft, the inner rotor configured and arranged to be driven only in the negative direction of the driveshaft;
        an outer rotor surrounding the inner rotor and being driven by the driveshaft, the outer rotor configured and arranged to be driven only in the positive direction of the driveshaft;
        whereby the rotation of the inner rotor relative to the rotation of the outer rotor generates electricity; and
    at least one drive rod having a buoy attached to one end, the at least one drive rod freely movable between an upstroke position and a downstroke position, the at least one drive rod driving the at least one generator as the at least one drive rod reciprocates between the upstroke position and the downstroke position;
    whereby the undulation of the ocean waves relative to the buoy of the at least one drive rod reciprocates the at least one drive rod between the upstroke position and the downstroke position.

2. The apparatus of claim 1, wherein the at least one generator includes at least three generators.

3. The apparatus of claim 2, wherein the at least one drive rod includes three drive rods, each drive rod being respectively driving one generator.

4. The apparatus of claim 3, wherein the three drive rods are arranged in a tetrahedral configuration.

5. The apparatus of claim 1, wherein the at least one drive rod includes three drive rods, each drive rod respectively driving said at least one generator.

6. The apparatus of claim 5, wherein the three drive rods are arranged in a tetrahedral configuration.

7. The apparatus of claim 1, further comprising an active neutral buoyancy means to maintain the body portion at a relative depth to the mean sea level whereby the length of the upstroke of the at least one drive rod is optimized according to the average height of the ocean waves.

8. The apparatus of claim 7, wherein said active neutral buoyancy means comprises:
    at least one bladder;
    a pump for filling and evacuating said at least one bladder; and
    a water level sensor supplying control inputs to said pump to fill and evacuate said at least on bladder.

9. The apparatus of claim 8, wherein said at least one bladder comprises three bladders.

10. The apparatus of claim 1, wherein the inner rotor includes at least one permanent magnet.

11. The apparatus of claim 1, wherein the outer rotor includes at least one coil.

12. The apparatus of claim 1, wherein the at least one drive rod drives the driveshaft of the at least one generator in the negative direction between the upstroke position and the downstroke position, and drives the driveshaft of the at least one generator in the positive direction between the downstroke position and upstroke position.

13. An apparatus for converting the kinetic energy of ocean waves into electricity, comprising:
    a main body member;

three generators located within the main body member for generating electricity, the three generators each having:
- a driveshaft having a positive direction and a negative direction,
- an inner rotor having at least one permanent magnet driven by the driveshaft, the inner rotor configured and arranged to be driven only in the negative direction of the driveshaft,
- a counter-rotating outer rotor having at least one coil surrounding the inner rotor and being driven by the driveshaft, the outer rotor configured and arranged to be driven only in the positive direction of the driveshaft;
- whereby the rotation of the inner rotor relative to the rotation of the outer rotor generates electricity; and three drive rods each having a buoy attached to one end, each of the three drive rods freely movable between an upstroke position and a downstroke position, each of the three drive rods respectively driving the driveshaft of one of the three generators in the negative direction when reciprocating to the downstroke position and in the positive direction when reciprocating to the upstroke position respectively;

whereby the undulation of the ocean waves relative to the buoys of the three drive rods reciprocates the three drive rods between the upstroke position and the downstroke position.

14. The apparatus of claim 13, wherein the three drive rods are arranged in a tetrahedral configuration.

15. The apparatus of claim 13, further comprising an active neutral buoyancy means to maintain the body portion at a relative depth to the mean sea level whereby the length of the upstroke of the at least one drive rod is optimized according to the average height of the ocean waves.

16. The apparatus of claim 15, wherein said active neutral buoyancy means comprises:
- at least one bladder;
- a pump for filling and evacuating said bladder; and
- a water level sensor for controlling said pump.

17. The apparatus of claim 16, wherein said at least one bladder comprises three bladders.

18. An apparatus for converting the kinetic energy of ocean waves into electricity, comprising:

a main body member;

three generators located within the main body member for generating electricity, the three generators each having:
- a driveshaft having a positive direction and a negative direction,
- an inner rotor having at least one permanent magnet driven by the driveshaft, the inner rotor configured and arranged to be driven only in the negative direction of the driveshaft,
- a counter-rotating outer rotor having at least one coil surrounding the inner rotor and being driven by the driveshaft, the outer rotor configured and arranged to be driven only in the positive direction of the driveshaft;
- whereby the rotation of the inner rotor relative to the rotation of the outer rotor generates electricity;

three drive rods arranged in a tetrahedral configuration, each of the three drive rod having a buoy attached to one end, each of the three drive rods freely movable between an upstroke position and a downstroke position, each of the three drive rods respectively driving the driveshaft of one of the three generators in the negative direction when reciprocating to the downstroke position and in the positive direction when reciprocating to the upstroke position respectively; and an active neutral buoyancy control system including at least one bladder, a pump for filling and evacuating said at least one bladder and a water level sensor for controlling said pump;

whereby the undulation of the ocean waves relative to the buoys of the three drive rods reciprocates the three drive rods between the upstroke position and the downstroke position.

19. The apparatus of claim 18, wherein said at least one bladder comprises three bladders.

* * * * *